(12) United States Patent
Hu et al.

(10) Patent No.: US 9,013,434 B2
(45) Date of Patent: Apr. 21, 2015

(54) TOUCH DISPLAY PANEL AND DRIVING METHOD THEREOF

(71) Applicant: Himax Technologies Limited, Tainan (TW)

(72) Inventors: Chia-Wei Hu, Tainan (TW); Yaw-Guang Chang, Tainan (TW); Shen-Feng Tai, Tainan (TW); Wai-Pan Wu, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 14/072,571

(22) Filed: Nov. 5, 2013

(65) Prior Publication Data

US 2014/0368449 A1    Dec. 18, 2014

Related U.S. Application Data

(60) Provisional application No. 61/834,855, filed on Jun. 13, 2013.

(51) Int. Cl.
*G06F 3/041* (2006.01)
*G06F 1/16* (2006.01)

(52) U.S. Cl.
CPC ............ *G06F 3/0412* (2013.01); *G06F 1/1643* (2013.01); *G06F 3/0416* (2013.01)

(58) Field of Classification Search
CPC .................. G09G 1/00; G09G 3/2011; G09G 2310/0205; G09G 3/2014; G09G 3/3674; G06F 3/0412; G06F 3/044
See application file for complete search history.

(56) References Cited

U.S. PATENT DOCUMENTS

2007/0285006 A1* 12/2007 Satoh et al. ............... 313/504

FOREIGN PATENT DOCUMENTS

| KR | 20070067960 | 6/2007 |
| KR | 20120019077 | 3/2012 |
| KR | 20130015582 | 2/2013 |
| KR | 20130015584 | 2/2013 |

OTHER PUBLICATIONS

"Office Action of Korean Counterpart Application", issued on Dec. 29, 2014, with English translation thereof, p. 1-p. 13.

* cited by examiner

Primary Examiner — Michael Faragalla
(74) Attorney, Agent, or Firm — J.C. Patents (57) ABSTRACT

A touch display panel, including first electrode patterns, second electrode patterns, active elements, third electrode patterns and fourth electrode patterns is provided. The second electrode patterns and the first electrode pattern are set to form pixel areas. Each of the active elements is disposed in one of the pixel areas and electrically connected to the corresponding first electrode pattern and second electrode pattern. The third electrode patterns are arranged along a direction of an arrangement direction of the second electrode patterns and divide the second electrode patterns into groups, wherein each third pattern covers columns of the pixel areas. The fourth electrode patterns are electrically insulated to the third electrode patterns. Each fourth electrode pattern is disposed in one of the pixel areas and electrically connected to the corresponding active element. A driving method of a touch display panel is also provided.

15 Claims, 5 Drawing Sheets

TOUCH DISPLAY PANEL AND DRIVING METHOD THEREOF

CROSS-REFERENCE TO RELATED APPLICATION

This application claims the priority benefits of U.S. provisional application Ser. No. 61/834,855, filed on Jun. 13, 2013. The entirety of the above-mentioned patent applications is hereby incorporated by reference herein and made a part of this specification.

BACKGROUND

1. Field of the Disclosure

The present disclosure generally relates to a display panel and a driving method thereof, and more particularly, to a touch display panel and a driving method thereof.

2. Description of Related Art

Along with the development of the display technology and the demand of the multifunctional display apparatus, the display apparatus with simple display function is unable to fulfill the requirement of the users nowadays. Therefore, a touch display panel has been proposed and put into practical use, where the touch function is incorporated into the display panel, so as to replace the external input apparatuses, such as keyboards and mouse devices for providing a more convenient and friendly interactive input operation means to the users. As the result, the display panel has become more attractive and intuitional in use.

According to the differences among the incorporation methods, current touch display panels are mainly classified to an out-cell touch display panel and an in-cell touch display panel. The out-cell touch display panel employs a bonding layer for attaching the touch panel to the display panel, and the advantage of using the bonding layer is that the out-cell touch display panel is relatively easy to manufacture. However, since the out-cell touch display panel is made by attaching two panels (including the display panel and the touch panel), and the two panels totally at least includes three layers of the substrates, the out-cell touch display panel is relatively thick, such that it is unable to comply with the demand of the user for a slim and small electronic product.

In contrast, by manufacturing the touch electrodes on the substrate of the display panel, the in-cell touch display panel is relatively thin because at least one layer of the substrates could be omitted during the manufacturing. However, the load between the touch electrode and the display electrode of the current in-cell touch display panel is large, so it is hardly to provide enough charging time for display and touch control functions. Therefore, how to reduce the load between the touch electrode and the display electrode but still maintain the thinness of the touch display panel as the advantage is still one of the unsolved topics for the people in the art.

SUMMARY OF THE INVENTION

The present invention provides a touch display panel, where the touch display panel is relatively thin and provides enough charging time for display and touch control functions.

The present invention provides a driving method of a touch display panel which is capable of reducing the load between the touch electrode and the display electrode.

According to an exemplary embodiment of the present invention, a touch display panel includes a first substrate, a plurality of first electrode patterns, a plurality of second electrode patterns, a plurality of active elements, a plurality of third electrode patterns, a plurality of fourth electrode patterns, a second substrate, a plurality of fifth electrode patterns and a display medium layer. The first electrode patterns and the second electrode patterns are disposed on the first substrate and electrically insulated to each other, where the first electrode patterns and the second electrode patterns are disposed to intersect each other, so as to form a plurality of pixel areas arranged in array. Each of the active elements is respectively disposed in one of the pixel areas and electrically connected to the corresponding first electrode pattern and the corresponding second electrode pattern. The third electrode patterns are arranged along an arrangement direction of the second electrode patterns and divide the second electrode patterns to a plurality of groups, where each of the third electrode patterns covers columns of the pixel areas. The fourth electrode patterns are electrically insulated to the third electrode patterns. Each of the fourth electrode patterns is disposed in one of the pixel area and electrically connected to the corresponding active element. The second substrate and the first substrate are disposed opposite to each other. The fifth electrode patterns are disposed on the second substrate, and an arrangement direction of the fifth electrode patterns is intersected with the arrangement direction of the second electrode patterns. The display medium layer is disposed between the first substrate and the second substrate.

According to an exemplary embodiment of the present invention, a driving method of a touch display panel of the present invention includes following steps. The touch display panel described above is provided, and a display mode and a sensing mode are performed by the touch display panel. The steps of performing the display method are included as follows. First, a direct current potential is provided to the third electrode pattern. Next, a display scanning signal is sequentially provided to the first electrode patterns, so as to turn on the active elements while the third electrode patterns are maintained at the direct current potential. Then, a display driving signal is sequentially provided to the second electrode patterns. The steps of performing the sensing mode are included as follows. First, the display scanning signal is stopped being provided, so as to turn off the active elements. Next, a touch scanning is sequentially performed to the groups. The touch control scanning includes providing a touch scanning signal to the second electrode patterns in the group to be scanned and floating the third electrode pattern corresponding to the group to be scanned simultaneously.

As described above, the electrode patterns of the touch display panel in the present invention are improved under the structure of the current display panel, so as to incorporate the touch control function into the display panel without disposing additional substrate. As the result, the touch display panel has the advantages of low cost and thinness. Further, by designing the third electrode patterns and the driving method, the interference of the touch scanning signals between the adjacent two groups is avoid, and the load between the touch electrode and the display electrode is reduced which provide sufficient charging time for display and touch control functions.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
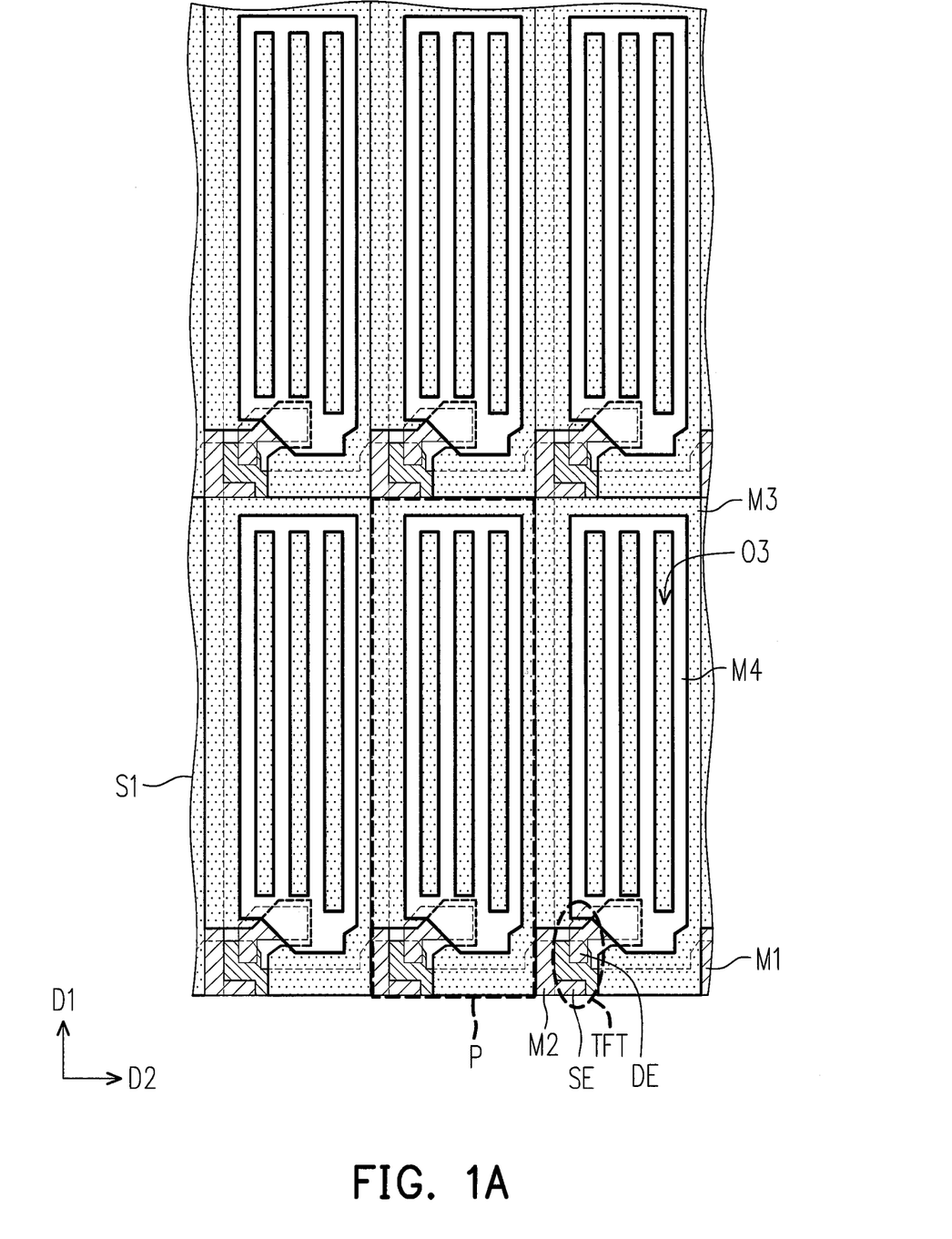
FIG. 1A is a partial top-view diagram of a touch display panel according to an embodiment of the present invention.
Figure 1B:
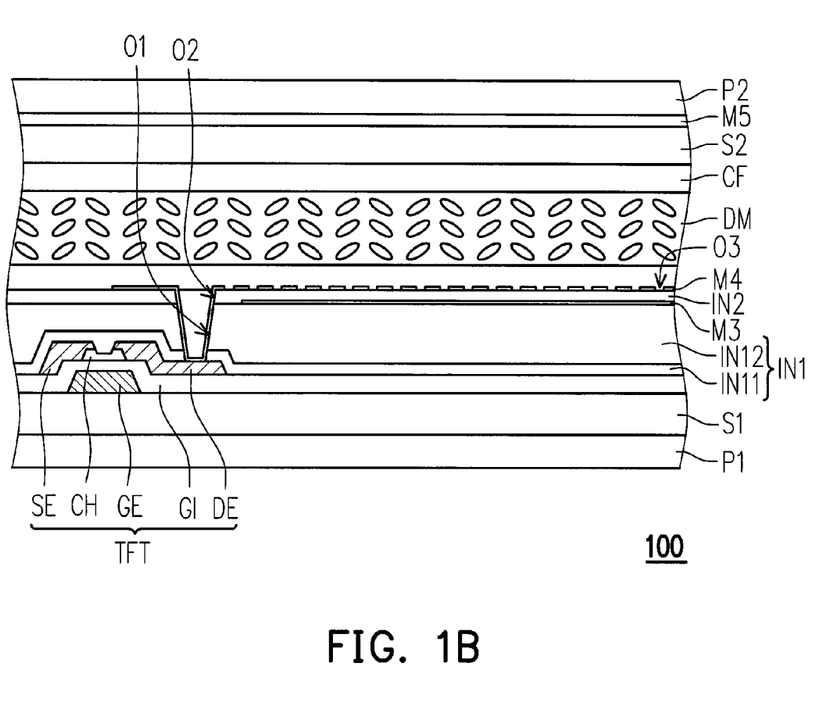
FIG. 1B is a cross-sectional diagram of a touch display panel according to an embodiment of the present invention.
Figure 1C:
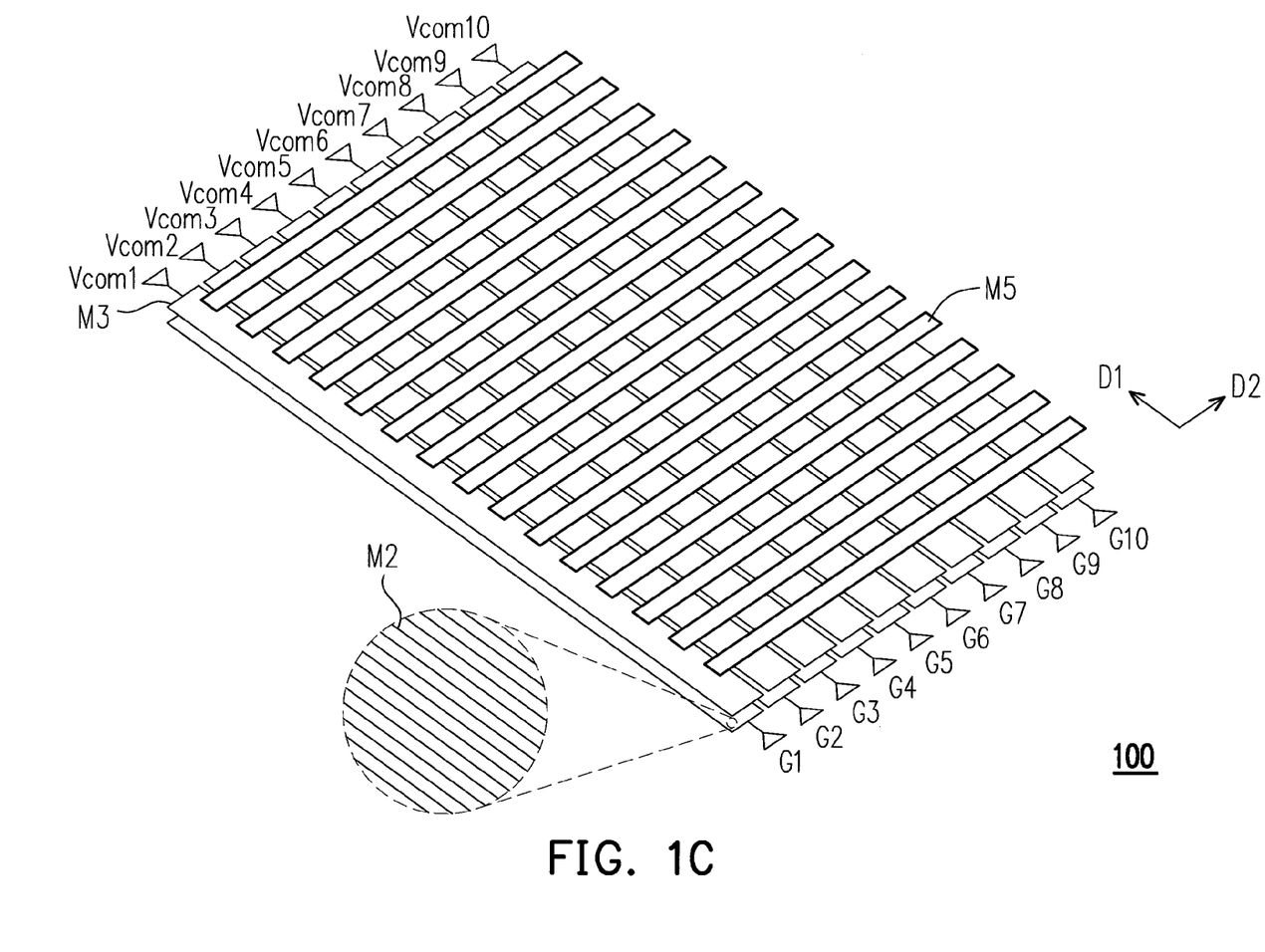
FIG. 1C is a side-view diagram of a touch display panel according to an embodiment of the present invention.

FIG. 1A is a partial top-view diagram of a touch display panel according to an embodiment of the present invention, where several film layers of the touch display panel are omitted in FIG. 1A for clearly showing the layer disposition of the electrode patterns on the first substrate. FIG. 1B is a cross-sectional diagram of a touch display panel according to an embodiment of the present invention. FIG. 1C is a side-view diagram of a touch display panel according to an embodiment of the present invention, where other film layers are omitted in FIG. 1C for clearly showing the layer disposition of the second electrode pattern, the fourth electrode pattern and the fifth electrode pattern.

Please referring to FIGS. 1A, 1B and 1C, the touch display panel 100 of the present embodiment includes a first substrate S1, a plurality of first electrode patterns M1, a plurality of second electrode patterns M2, a plurality of active elements TFT, a plurality of third electrode patterns M3, a plurality of fourth electrode patterns M4, a second substrate S2, a plurality of fifth electrode patterns M5 and a display medium layer DM.

The first electrode patterns M1 and the second electrode patterns M2 are disposed on the first substrate S1, where the second electrode patterns M2 and the first electrode patterns are disposed to intersect each other, so as to form a plurality of pixel areas P arranged in a matrix form. In detail, the first electrode patterns M1 of the present embodiment are, for example, arranged along a first direction D1 and respectively extended along a second direction D2. The second electrode patterns M2 are, for example, arranged along the second direction D2 and respectively extended along the first direction D1. The first direction D1 is, for example but not limited to, perpendicular to the second direction D2. Taking the resolution of 600 by 800 pixels as the example, the touch display panel 100 includes, for example, 480000 pixel areas P arranged in 600 rows by 800 columns (FIG. 1A schematically illustrates six pixel areas P), where the first direction D1 is, for instance, the direction of the rows, and the second direction is, for instance, the direction of the columns.

Each of the active elements TFT is disposed in one of the pixel areas P and electrically connected to the corresponding first electrode pattern M1 and the second electrode pattern M2. As shown in FIG. 1B, the active element TFT in the present embodiment is illustrated as the bottom gate thin film transistor in following description, but the type of the active element TFT is not limited thereto in the present invention. Furthermore, each of the active elements TFT of the present embodiment includes, for example, a gate GE, a gate insulation layer GI, a channel layer CH, a source SE and a drain DE. The gate GE is disposed on the first substrate S1 and electrically connected to the first electrode pattern M1. In one embodiment, the gate GE and the first electrode pattern M1 are formed by, for example, patterning a first electrode layer.

The gate insulation layer GI covers the gate GE, the first electrode pattern M1 and the first substrate S1, and the material of the gate insulation layer GI is, for instance, the silica material or the silicon nitride material with high permittivity, but the present invention is not limited thereto. The channel layer Ch is disposed on the gate insulation layer GI and located above the gate GE. The material of the channel layer LH is, for example, crystalline silicon semiconductor, amorphous semiconductor, polysilicon semiconductor or oxide semiconductor, but the present invention is not limited thereto.

The source SE is electrically connected to the second electrode pattern M2, and the drain DE is electrically insulated to the source SE. The source SE and the drain DE are located on the channel layer CH and oppositely extended from two sides of the channel layer CH to the top of the gate insulation layer GI. Further, the source SE, the drain DE and the second electrode pattern M2 are formed by, for example, patterning a second electrode layer. Before forming the second electrode pattern M2, the gate insulation layer GI already covers the first electrode pattern M1. Therefore, although the second electrode pattern M2 and the first electrode pattern M1 are disposed to intersect each other, the second electrode pattern M2 and the first electrode pattern M1 are also electrically insulated due to the gate insulation layer GI.

In the present embodiment, the touch display layer 100 further includes a first insulation layer IN1, where the first insulation layer IN1, for example, covers the source SE, the drain DE and the gate insulation layer GI to protect the active element TFT. The first insulation layer IN1 is, for instance, a single insulation layer or multiple layers structure. Although the insulation layer with two sub-layers (including the first sub insulation layer IN11 and the second sub insulation layer IN12) is shown in FIG. 1B for description, but the present invention is not limited thereto.

In the present embodiment, the third electrode patterns M3 are disposed on the first insulation layer M1 and arranged along the arrangement direction of the second electrode patterns M2. Specifically, as shown in FIG. 1C, the third electrode patterns M3 (including the third electrode patterns Vcom1, Vcom2, Vcom3, Vcom4, Vcom5, Vcom6, Vcom7, Vcom8, Vcom9, Vcom10) are arranged along the first direction D1 and respectively extended along the second direction D2. In addition, the third electrode patterns M3 divide the second electrode patterns M2 into a plurality of groups G1, G2, G3, G4, G5, G6, G7, G8, G9 and G10, where each of the third electrode patterns M3 covers columns of the pixel areas P. Taking the resolution of 600 by 800 pixels as the example, if the second electrode patterns M2 are divided into ten groups, then each group (G1, G2, G3, G4, G5, G6, G7, G8, G9 and G10) respectively includes, for example, 80 second electrode patterns M2. In other words, each of the third electrode patterns M3 is disposed corresponding to 80 second electrode patterns and covers, for example, 48000 pixel areas. However, the number of the second electrode patterns M2, the number of the covered pixel areas P and the number of the groups corresponding to each of the third electrode patterns M3 are chosen according to the resolution of touch control function, the size of the touch display panel 100 and so on. Therefore, the present invention is not limited thereto. Moreover, the third electrode pattern M3 exposes, for example but not limited to, the location of the active element TFT in the pixel area P, so as to benefit the repair process of the defect in future.

Each of the fourth electrode pattern M4 is disposed in one of the pixel areas and electrically connected to the corresponding active element TFT. In the present embodiment, the third electrode patterns M3 and the fourth electrode patterns M4 are located, for example, at the same side of the display medium layer DM. In order to electrically insulate the fourth electrode pattern M4 from the third electrode pattern M3, the touch display panel 100 further includes a second insulation layer IN2. To be more specific, the second insulation layer IN2 is, for example, disposed on the third electrode patterns M3 and the second sub insulation layer IN12, and the fourth electrode patterns M4 are disposed on the second insulation layer IN2. That is to say, the third electrode patterns M3 are located between the fourth electrode patterns M4 and the first substrate S1. Also, the first insulation layer IN1 has openings O1, and the second insulation layer IN2 has openings O2. The openings O1 expose the drains DE, and the openings O2 expose the openings O1. In addition, the fourth electrode patterns M4 are electrically connected to the drains DE through the openings O1 and the openings O2.

In the present embodiment, the fourth electrode pattern M4 is closer to the adjacent display medium layer DM as compared to the third electrode pattern M3, and each of the fourth electrode patterns M4 has, for example, at least one opening O3 for exposing the corresponding third electrode pattern M3. Hence, the third electrode patterns M3 and the fourth electrode patterns M4 are used to modulate the status of the display medium layer DM by changing the horizontal electric field, so as to control the gray scales of the displayed image. In the present embodiment, the structure of the common electrode and the pixel electrode set in the In-Plane Switching (IPS) display panel is used for explaining the present invention, but the present invention is not limited thereto. In other embodiments, the third electrode patterns M3 and the fourth electrode patterns M4 are comb-like electrodes, where the comb-like portions of the third electrode patterns M3 and the fourth electrode patterns M4 are alternately arranged with each other, and that is the structure of the common electrode and the pixel electrode normally set in the Fringe Field Switching (FFS) display panel. Under such configuration, the status of the display medium layer DM can also be modulated by changing the horizontal electric field attributed from the third electrode patterns M3 and the fourth electrode patterns M4.

The second substrate S2 and the first substrate S1 are disposed opposite to each other. In the present embodiment, the first substrate S1 and the second substrate S2 are the light transmissive flexible substrate or the light transmissive hard substrate. For instance, the material of the first substrate S1 and the second substrate S2 is, for example, the glass, the quartzite, the organic polymer or other suitable materials.

The fifth electrode patterns M5 are disposed on the second substrate S2, and the arrangement direction of the fifth electrode patterns M5 is intersected with the arrangement direction of the second electrode patterns M2. In the present embodiment, the fifth electrode patterns M5 are illustrated as the stripe electrodes for following description. The fifth electrode patterns M5 are, for example but not limited to, arranged along the first direction D1 and respectively extended towards the second direction D2. However, the pattern design of the fifth electrode patterns M5 is not limited thereto. Further, in considering to the light transmittance, the material of the fifth electrode patterns M5 is preferably the transparent conductive material. For instance, the transparent conductive material is the indium tin oxide (ITO), the indium zinc oxide (IZO), the aluminum tin oxide (ATO), the aluminum zinc oxide (AZO), the indium gallium zinc oxide (IGZO), other suitable oxides or the stacked layers formed by at least two layers of the foregoing materials.

The display medium layer DM is disposed between the first substrate S1 and the second substrate S2. In the present embodiment, the display medium layer DM and the fifth electrode patterns M5 are, for example, respectively located at the opposite sides of the second substrate S2. Further, the display medium layer DM is, for example, the liquid material layer, the organic electroluminescent layer or other suitable medium layer. Under the structure that the display medium layer DM is the liquid material layer, the touch display panel 100 further includes a color filter layer CF, a first polarizing plate P1 and a second polarizing plate P2. In the present embodiment, the fifth electrode patterns M5 and the color filter layer CF are respectively disposed at the opposite sides of the second substrate S2, and the color filter layer CF is, for example, located on the second substrate S2 and between the display medium layer DM and the second substrate S2. However, in other embodiments, the color filter CF is incorporated to the first substrate S1. The first polarizing plate P1 is located on the first substrate S1, the second polarizing plate is located on the second substrate S2, and the first substrate S1 and the second substrate S2 are located between the first polarizing plate P1 and the second polarizing plate P2.

In the present embodiment, the electrode patterns (including the third electrode patterns M3, and the fifth electrode patterns M5) on each of the film layers of the touch display panel 100 have been improved under the current structure of the display panel, so as to incorporate the touch control function into the display panel. Because the touch control function could be incorporated into the display panel without adding additional film layers or substrates, the touch display panel 100 of the present embodiment has the advantages of low cost and thinness.

Specifically, during the display mode, the first electrode patterns M1 are, for example, used in transmitting the display scanning signal (i.e. the so-called scan lines), the second electrode patterns M2 are, for example, used in transmitting the display driving signal (i.e. the so-called data lines) and the third electrode patterns M3 and the fourth electrode patterns M4 are used in changing the status of the display medium layer DM, where the third electrode patterns M3 are, for example, the common electrodes, and the fourth electrode patterns M4 are, for example, the pixel electrodes. Further, the fifth electrode patterns M5 are used as the electrostatic discharge (ESD) protection layer.

During the sensing mode (determining the coordinate of the touch point), the first electrode patterns M1 are used as the reference electrode of the touch sensing circuit, the second electrode patterns M2 are, for example, used in transmitting the touch scanning signal, the third electrode patterns M3 are, for example, used as the high impedance element for avoiding the interference of the touch scanning signal between the adjacent two groups, and the fifth electrode patterns M5 is used in receiving the touch driving signal generated by the touch operation.

Figure 2:
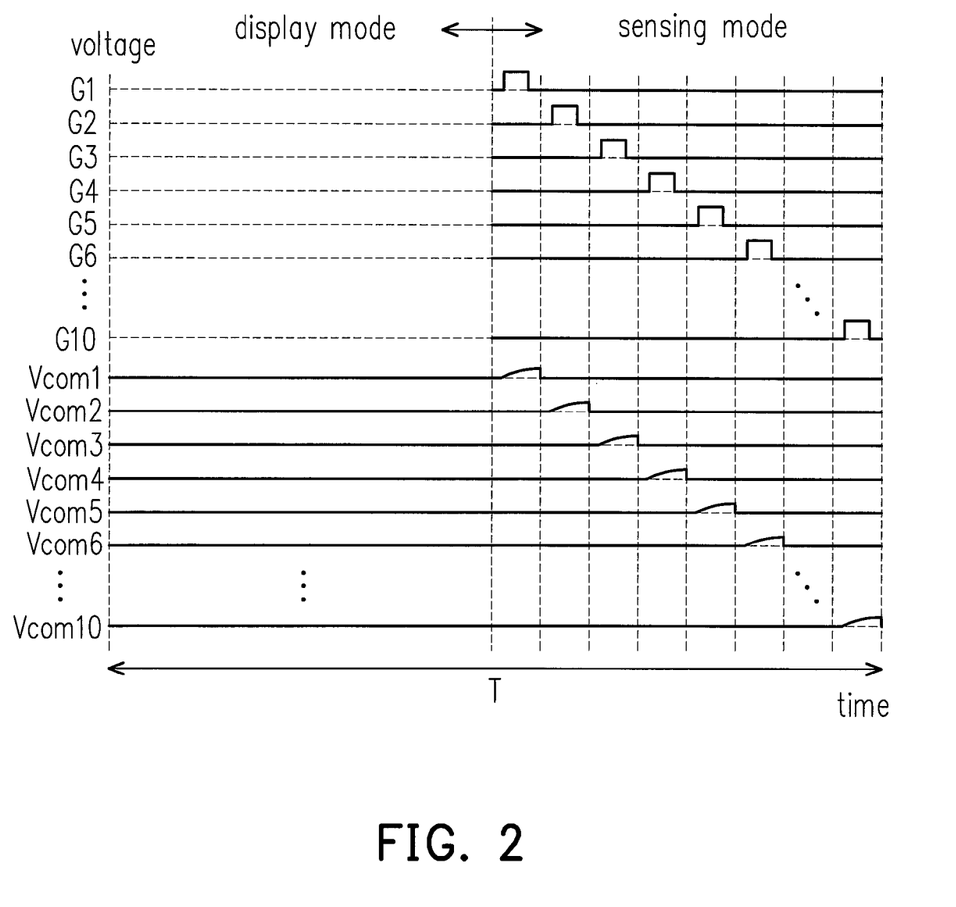
FIG. 2 and FIG. 3 are diagrams respectively illustrating two control methods of a touch display panel according to an embodiment of the present invention.
Figure 3:
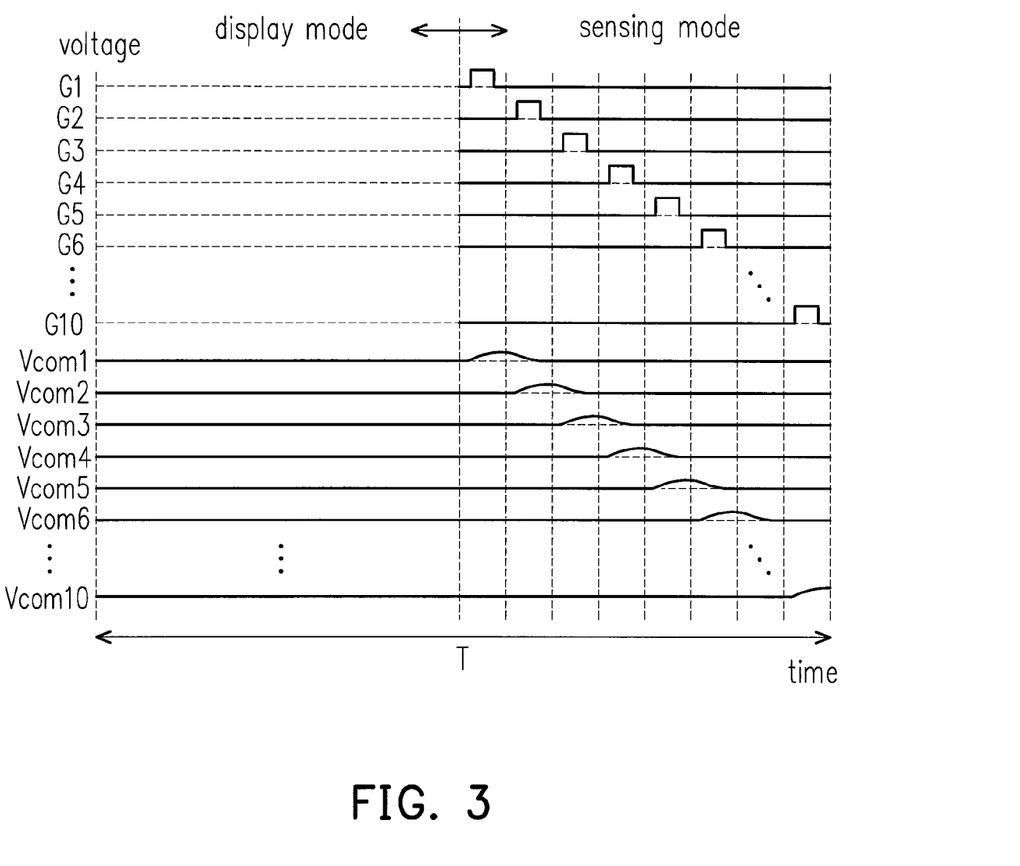

In the following description, FIG. 2 and FIG. 3 are used for further illustrating the driving method of the electrode patterns under the display mode and the sensing mode. FIG. 2 and FIG. 3 are diagrams respectively illustrating two control methods of a touch display panel according to an embodiment of the present invention. Referring to FIG. 1A, FIG. 1C and FIG. 2, the driving method of the touch display panel in the present embodiment includes the following steps. The touch display panel 100 mentioned above is provided, and the display mode and the sensing mode are performed by the touch display panel 100, where the display mode and the sensing mode are, for example, alternately performed and both the sensing mode and the display mode are, for example, performed within the same frame period T.

The steps of performing the display mode are included as follows. First, the direct current potential is provided to the third electrode patterns Vcom1 to Vcom10. Next, the display scanning signal is sequentially provided to each of the first electrode patterns M1 while the third electrode patterns Vcom1 to Vcom10 are maintained at the direct current potential, so as to turn on the active elements TFT. Then, the display driving signal is sequentially provided to each of the second electrode patterns M2. It should be noted that, under the display mode, the display driving signal is provided to the second electrode patterns M2 stripe by stripe, but not provided to the second electrode patterns M2 by groups (groups G1 to G10). Since FIG. 2 does not label each row of the second electrode patterns M2 along the D1 direction, the feature of providing the display driving signal is omitted on the FIG. 2 as well.

On the other hand, the steps of performing the sensing mode are included as follows. First, the display scanning signal is halted, so as to turn off the active elements TFT. Next, the touch scanning is sequentially performed to the groups G1 to G10. The touch scanning includes providing the touch scanning signal to the second electrode patterns M2 in the group (one of groups G1 to G10) to be scanned and floating the third electrode pattern (one of the third electrode patterns Vcom1 to Vcom10) corresponding to the group to be scanned simultaneously. In other words, under the sensing mode, the third electrode pattern is floated stripe by stripe, and the touch scanning signal is provided to the second electrode patterns group by group, but not provided to the second electrode patterns stripe by stripe.

By floating the third electrode pattern (one of the third electrode patterns Vcom1 to Vcom10) corresponding to the group to be scanned, the signal of the group is able to avoid the shielding from the third electrode pattern. Further, since the floated third electrode pattern is at the high impedance status, the interference of the touch scanning signals between the adjacent two groups is avoid, and the load between the group to be scanned and the third electrode pattern is reduced, so as to provide sufficient charging time for display and touch control functions.

It should be noted that, in FIG. 2, the fluctuation of the voltage (the position which indicated by the arrow) at the floated third electrode patterns Vcom1-Vcom10 is caused by the capacitance coupling effect between the third electrode patterns Vcom1-Vcom10 and the corresponding groups G1-G10. Under the current structure of the display panel, the common electrode is usually a single and without patterned electrode. Thus, during the touch control scanning, the whole electrode pattern is maintained at the floating status, so as to avoid shielding the touch scanning signal. However, since the common electrode is the single and without patterned electrode, no matter the touch scanning signal is provided to which group, the capacitance coupling effect is occurred between the common electrode and the selected group. Therefore, it is hardly to recognize the practical touch position of the user. By contrast, the present embodiment performs the pattern design on the common electrode (the third electrode pattern), such that the third electrode pattern corresponding to the groups are electrically independent to each other, so as to avoid the misjudgement of the touch position or the occurrence of the situation which is hardly to recognize the touch position.

In the present embodiment, when the touch scanning signal is not provided to the group (one of the groups G1-G10) or when the touch scanning signal is stopped being provided to the group, the direct current potential is provided to the third electrode patterns (one of the third electrode pattern Vcom1-Vcom10) corresponding to the groups. That is to say, the third electrode patterns are only floated when the touch scanning signal is provided to the corresponding group. However, the present invention is not limited thereto.

Referring to FIG. 3, the steps of performing the display mode in the present embodiment is as same as the steps shown in FIG. 2. The main difference is that, under the sensing mode, the direct current potential is only provided to the third electrode pattern (one of the third electrode patterns Vcom1-Vcom10) when the touch scanning signal is not provided. In other words, when the touch scanning signal is provided to the group (one of the groups G1-G10) and when the touch scanning signal is stopped being provided to the group, the third electrode pattern corresponding to the group is continuously floated. From the arrow shown in FIG. 3, when the touch scanning signal is stopped being provided to the group corresponding to the third electrode pattern, since the influence to the third electrode pattern from the capacitance coupling effect between the third electrode pattern and the corresponding group is gradually decreased and the third electrode pattern is not susceptible by the adjacent group, the voltage at the third electrode pattern will drop.

As described above, the electrode patterns of the touch display panel in the present invention are improved under the structure of the current display panel, so as to incorporate the touch control function into the display panel without adding additional substrate. As the result, the touch display panel has the advantages of low cost and thinness. Further, by designing the third electrode patterns and the driving method, the interference of the touch scanning signals between the adjacent two groups is avoid, and the load between the touch electrode and the display electrode is reduced which provide sufficient charging time for display and touch control functions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display panel, comprising:
a first substrate;
a plurality of first electrode patterns, disposed on the first substrate;
a plurality of second electrode patterns, electrically insulated to the first electrode patterns, disposed on the first substrate and disposed to intersect with the first electrode patterns, so as to form a plurality of pixel areas arranged in array;
a plurality of active elements, each of the active elements is disposed in one of the pixel areas and electrically connected to the corresponding first electrode pattern and the corresponding second electrode pattern;
a plurality of third electrode patterns, arranged along an arrangement direction of the second electrode patterns, where the third electrode patterns divide the second electrode patterns into a plurality of groups, and each of the third electrode patterns covers columns of the pixel areas;

a plurality of fourth electrode patterns, electrically insulated to the third electrode patterns, each of the fourth electrode patterns is disposed in one of the pixel areas and electrically connected to the corresponding active element;

a second substrate, disposed opposite to the first substrate;

a plurality of fifth electrode patterns, disposed on the second substrate, and an arrangement direction of the fifth electrode patterns is intersected with the arrangement direction of the second electrode patterns; and a display medium layer, disposed between the first substrate and the second substrate.

2. The touch display panel according to claim 1, wherein the first electrode patterns are arranged along a first direction and respectively extended along a second direction, the second electrode patterns are arranged along the second direction and respectively extended along the first direction, and the fifth electrode patterns are arranged along the first direction and respectively extended along the second direction.

3. The touch display panel according to claim 2, wherein the first direction is perpendicular to the second direction.

4. The touch display panel according to claim 1, wherein the third electrode patterns expose the active elements.

5. The touch display panel according to claim 1, wherein the third electrode patterns and the fourth electrode patterns are located at a same side of the display medium layer.

6. The touch display panel according to claim 5, wherein the third electrode patterns are located between the fourth electrode patterns and the first substrate, each of the fourth electrode patterns has at least one opening, and the opening exposes the corresponding third electrode pattern.

7. The touch display panel according to claim 1, further comprising a color filter layer disposed on the second substrate and located between the display medium layer and the second substrate.

8. The touch display panel according to claim 7, wherein the fifth electrode patterns and the color filter layer are respectively located at opposite sides of the second substrate.

9. The touch display panel according to claim 1, further comprising a first polarizing plate and a second polarizing plate, the first polarizing plate is located at the first substrate, the second polarizing plate is located at the second substrate, and the first substrate and the second substrate are located between the first polarizing plate and the second polarizing plate.

10. A driving method of a touch display panel, comprising:
providing the touch display panel as claimed in claim 1;
performing a display mode, comprising:
    providing a direct current potential to the third electrode patterns;
    sequentially providing a display scanning signal to each of the first electrode patterns while the third electrode patterns are maintained at the direct current potential, so as to turn on the active elements;
    sequentially providing a display driving signal to each of the second electrode patterns; and
performing a sensing mode, comprising:
    stopping providing the display scanning signal, so as to turn off the active element;
    sequentially performing a touch scanning to the groups, including providing a touch scanning signal to the second electrode patterns of the group to be scanned and floating the third electrode pattern corresponding to the group to be scanned simultaneously.

11. The driving method of the touch display panel according to claim 10, wherein under the sensing mode, when the touch scanning signal is not provided to the groups and when the touch scanning signal is stopped being provided to the groups, providing the direct current potential to the third electrode patterns corresponding to the groups.

12. The driving method of the touch display panel according to claim 10, wherein under the sensing mode, when the touch scanning signal is not provided to the groups, providing the direct current potential to the third electrode patterns corresponding to the groups; and when the touch scanning signal is stopped being provided to the groups, continuously floating the third electrode patterns corresponding to the groups.

13. The driving method of the touch display panel according to claim 10, wherein the display mode and the sensing mode are alternately performed.

14. The driving method of the touch display panel according to claim 10, wherein the display mode and the sensing mode are performed within a same frame period.

15. The driving method of the touch display panel according to claim 10, wherein the third electrode patterns are electrically independent to each other.

* * * * *